Patented Sept. 15, 1953

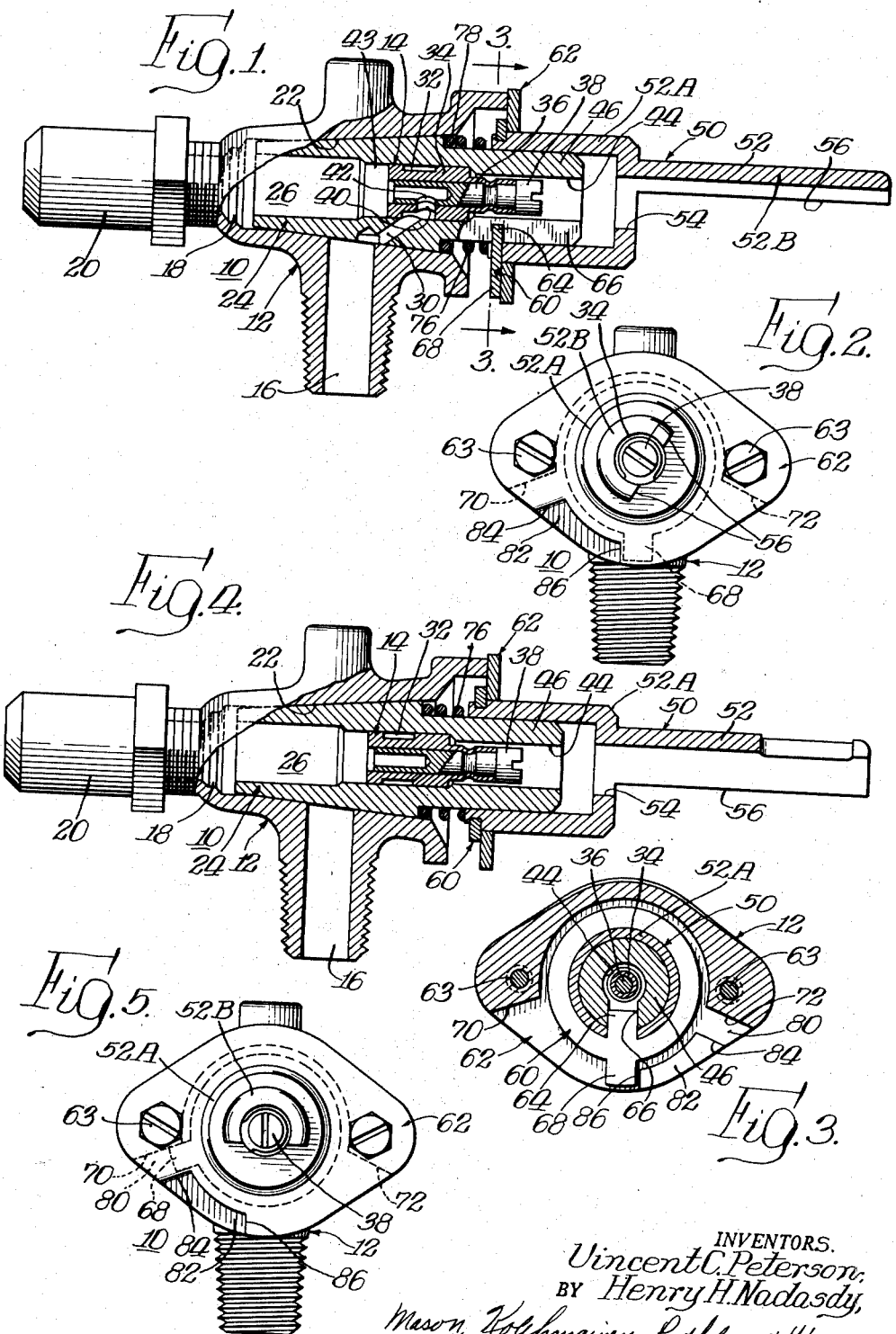

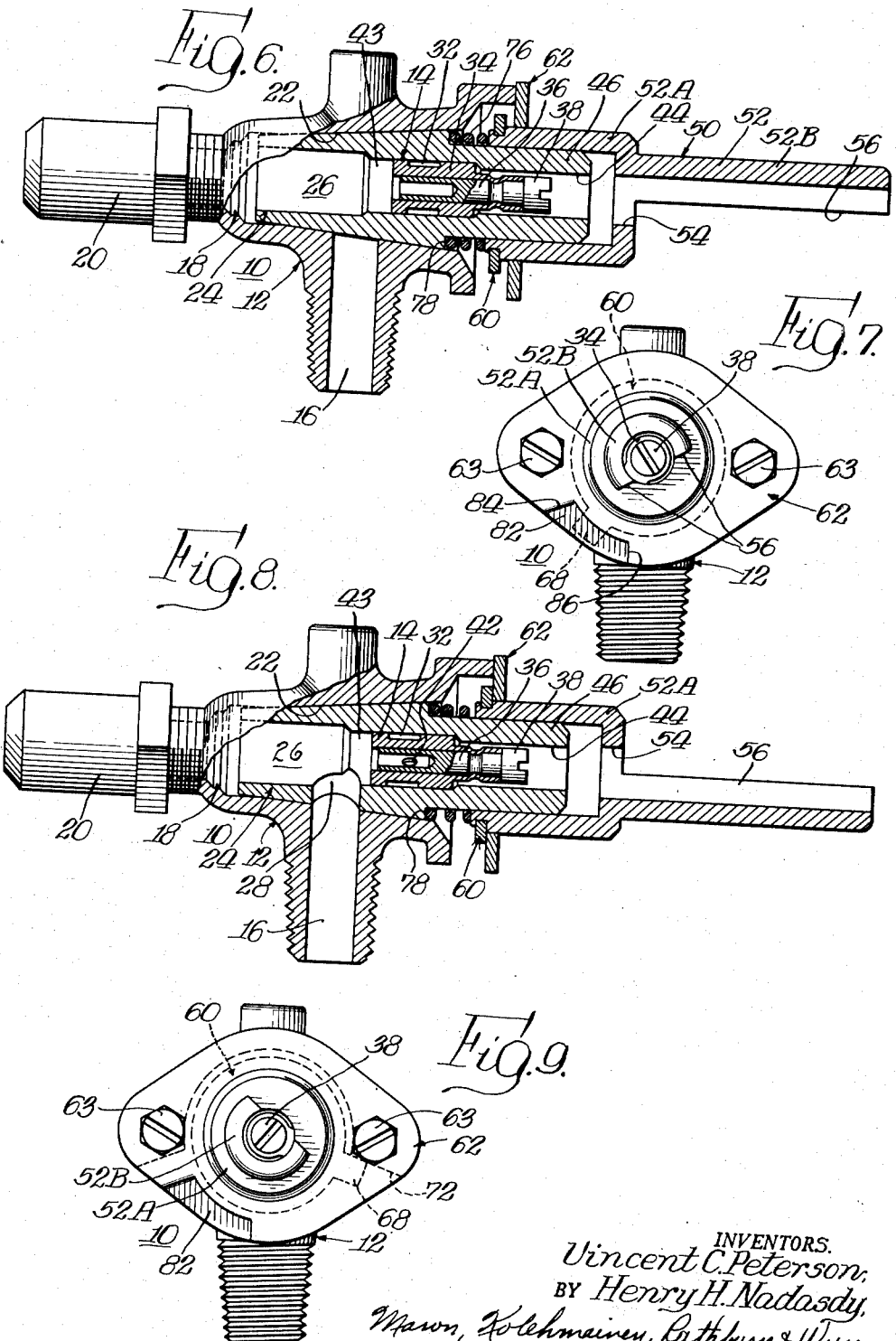

2,652,225

UNITED STATES PATENT OFFICE 2,652,225

LOCKING STEM ADJUSTMENT VALVE

Vincent C. Peterson, Carney, Mich., and Henry H. Nadasdy, Chicago, Ill., assignors to Harper-Wyman Company, Chicago, Ill., a corporation of Illinois Application November 23, 1948, Serial No. 61,652

4 Claims. (Cl. 251—152)

1

The present invention relates to gas valves and has for its primary object the provision of a new and improved locking stem adjustment type gas valve.

Another object of the present invention is to provide a new and improved locking stem adjustment valve including a considerably simplified and readily fabricated locking and driving mechanism.

A further object of the present invention is the provision of a new and improved locking stem adjustment valve comprising what may be considered a two-part stem of two slidably connected parts and including a single structural element for drivingly connecting the two parts and for locking the valve in off position.

A further object of the present invention is to provide a new and improved valve of the type set forth in the preceding paragraph, in which the single element is utilized also to indicate the position of the valve and to determine the limits of movement of the valve.

Other objects and advantages of the invention will become apparent from the following description of an embodiment thereof, in the course of which reference is had to the accompanying drawings, in which:

Fig. 1 is a side elevational view, partly in axial section, of a valve (minus the conventional operating handle) constructed in accordance with the present invention and illustrated in a low position;

Fig. 2 is an end view from the outer or handle receiving end of the valve shown in Fig. 1;

Fig. 3 is a transverse cross sectional view taken along the line 3—3 of Fig. 1;

Figs. 4 and 5 are views similar to Figs. 1 and 2 illustrating the valve in its off position;

Figs. 6 and 7 are similar to Figs. 1 and 2, illustrating the valve in an intermediate position between the off and low positions; and Figs. 8 and 9 are views similar to Figs. 1 and 2 of the valve in its full on or high position.

The present invention has been illustrated in conjunction with a plural position gas valve 10 of the type commonly called a high-low valve, having a body 12 and stem adjustment means comprising an auxiliary valve unit 14 which is adjustable for the purpose of determining the flow of gas in the low position of the valve and including features disclosed and claimed in the copending applications of Philip S. Harper. Serial Nos. 576,673 and 576,674, filed February 7, 1945, and of Vincent C. Peterson, Serial No. 600,795, filed June 21, 1945, and assigned to the assignee of this application.

2

The present invention has to do with a mechanism for driving and locking the valve in its off position and for indicating and determining other positions of the valve, which mechanism will be described in detail after a description of other details of the valve which will provide a better understanding of the advantages and operation of the invention.

The valve body is provided with an inlet passageway 16, an outlet passageway 18, communicating at its discharge end with a conventional adjustable outlet hood 20, a tapered plug-receiving chamber 22, and a valve plug 24 having a correspondingly tapered outer surface closely fitting within the tapered plug-receiving chamber.

The valve plug includes an axial passageway 26 at one end and a pair of angularly spaced apart radially extending passageways 28 and 30, the former of which registers with the inlet passageway in the full on position of the valve as shown in Fig. 8 and the latter in the low position as shown in Fig. 1. Passageway 28 extends directly from the axial passageway to the exterior of the plug, whereas the passageway 30 leads to an annular passageway 32 extending around the auxiliary valve unit and formed as by an annular groove in an insert 34 forming part of the auxiliary valve unit.

The flow of gas in the low position is regulatable by adjustment of a rotatable valve member 36 of the auxiliary valve unit which has an enlarged slotted head 38 whereby it can be turned to adjust the registry of openings 40 and 42 in insert 34 and the rotatable valve member 36, respectively. The insert 34 is fixedly mounted in an axial passageway 43 communicating with the axial passageway 26 and the rotatable valve member 36 extends into a smaller continuation 44 of the axial passageway through the reduced diameter forward extension 46 of the valve plug which forms, in effect, part of the valve operating stem.

In accordance with the present invention, the valve is provided with a novel simplified mechanism for driving and locking the valve in its off position, for indicating the various positions of the valve and for determining the off and high positions, and which is furthermore so constructed that the stem adjustment means is made readily accessible for the purpose of adjusting the flow of gas. The mechanism includes what may be considered a two-part stem, indicated as a whole by the reference character 50 and including the extension 46 and a part 52 which is rotatable with but axially movable relative to the part 46. While the two parts 46 and 52 have been stated to be parts of the stem 50, this is a matter of preference, as the stem can be considered to include either two parts or a portion of the valve plug and a single stem part. Hereafter the two parts will be referred to as parts of the stem and while they will also be so claimed, it should be understood that the terminology is to be considered broadly and to include either a two-part stem or a stem and a portion of the valve plug.

The inner stem portion 46 is provided with the previously referred to axial passageway 44 and the outer portion 52 includes an enlarged tubular portion 52A fitting relatively closely around the outer end of portion 46 and a reduced diameter portion 52B having an axial passageway 54 extending through it and provided with a flat 56, thereby effectively making the outer end D-shaped better nonrotatably to receive a valve operating handle, not shown. The construction, as readily apparent from Fig. 1, is such that the slotted outer end 38 of the rotatable auxiliary valve element 36 can be reached by a screw driver after removal of the handle for the purpose of adjusting the flow of gas.

The mechanism includes, in addition to the operating stem, but a few readily made and assembled parts. These are, in the main, a combined driving, locking and indicating washer 60 and a locking and position indicating end cap or plate 62 secured to the front of the valve body as by screws 63. The washer 60 surrounds the stem portion 46 and is secured to the inner end of portion 52 in suitable manner, as by peening. It includes a number of projections, one being a radially inwardly extending projection 64, in the nature of a tongue and extending into an axially extending slot 66 in stem portion 46, thereby providing a driving connection between the two stem parts and yet enabling the parts to be moved axially relative to each other. Another projection is the radially outwardly extending projection 68, also in the nature of a tongue, which is movable against the stop defining shoulders 70 and 72 formed at the front of the valve body and determining the off and full on positions of the valve plug, respectively.

The valve stem or, more particularly, that portion carrying the washer is forced outwardly so that the washer bears against the plate 62 by a spring 76 encircling stem portion 46 and bearing against the washer 60 and a shoulder 78 formed in the valve plug.

The valve is locked in its off position, in which it is shown in Figs. 4 and 5, by the projection 68 and by a radially extending recess 80 in which the projection 68 is yieldably held by the spring 76. The recess 80 is formed in suitable manner, as by shoulder 70 and an inwardly stamped portion 82 of the plate 62. The end 84 of this portion, which forms a shoulder, is quite square so that the outer portion 52 of the valve stem has to be pushed inwardly before the valve plug can be rotated. Once the stem is pushed in and turned slightly, the projection 68 bears against the undersurface of portion 82, which has an arcuate length such that the projection 68 falls off of it in the low position, shown in Figs. 1, 2 and 3. The shoulder 86 off which the projection falls in this low position is inclined somewhat so that the low position can readily be determined by a restraint to movement when the valve plug is being turned from its high position toward the off position.

The operation of the valve as a whole will now be described. Assuming first that the valve is in its off position, then the parts occupy the positions in which they are illustrated in Figs. 4 and 5. The valve plug is locked by reason of the locking projection 68 being yieldably held in recess 80 by the spring 76. The shoulder 84 of the recess forming means is square so that it is necessary to move inwardly the outer part 52 of the stem before the valve can be unlocked.

To unlock the valve it is necessary only to move the outer stem part 52 axially inwardly, thereby to move the washer 60 inwardly so that the projection 68 is moved out of the recess 80. In normal operation, the valve is unlocked in the foregoing manner and initially turned to its full on position, i. e., to the position where projection 68 abuts against shoulder 72, as illustrated in Fig. 9.

To turn the valve plug to its low position, as from the full on or high position, the stem and plug are turned in a clockwise direction from the position of Figs. 8 and 9 to the position of Figs. 1 and 2. When the low position is reached, the projection 68 strikes the inclined shoulder 86 on plate 62 and the movement of the plug is restrained, thus indicating that the valve has been moved to its low position.

To move from the low to the off position, the stem and plug are turned so that the projection 68 rises along the shoulder 86 to a position such as indicated in Figs. 6 and 7. The movement is continued until the projection 68 strikes shoulder 70 whereat the spring 76 moves the stem part 52 and the washer 60 outwardly placing projection 68 into recess 80 and thus locking the valve in its off position.

While the present invention has been described in connection with the details of a particular embodiment thereof, it should be understood that such details are not intended to be limitative of the invention except in so far as set forth in the accompanying claims.

Having thus described by invention, what we claim as new and desire to secure by Letters Patent of the United States is:

1. A stem adjustment high-low valve including a valve element, an operating tubular stem portion extending outwardly from the element having an axially extending slot therein, a second tubular stem portion fitting movably but relatively closely around said first portion, a locking and driving washer encircling said extension and secured to said second portion and having radially inwardly and outwardly extending tongues, said inwardly extending tongue extending into said slot and connecting said stem portions for angular movement with the valve element, and the valve including means defining a locking recess adapted to receive said outwardly extending tongue in one position of the valve element.

2. A stem adjustment high-low valve including a valve element, an operating tubular stem portion extending axially outwardly from the valve element having an axially extending slot therein, a second tubular stem portion fitting movably but relatively closely around said first portion, a locking, indicating and driving washer secured to said second portion having radially inwardly and outwardly extending tongues, said inwardly extending tongue extending into said slot and connecting said stem portions for rotation of the valve element, a locking plate fixedly secured to the valve having an axially inwardly extending portion defining a pair of spaced apart shoulders, one of said shoulders being steep sided and located so that when the valve element is in its off position the outwardly extending tongue on said washer is engageable thereby to lock the element and the other being so located as to be engaged by said outwardly extending tongue in the low position of said valve moderately to restrict rotation of the element toward its off position, and spring means acting on said second stem portion and washer for biasing them toward said plate.

3. A gas valve including a valve element, an operating stem portion extending axially outwardly from the element and having an axially extending slot therein, a tubular stem portion fitting movably but relatively closely around said first portion, a locking and driving washer encircling said first stem portion and secured to the second portion and having radially inwardly and outwardly extending tongues, said inwardly extending tongue extending into said slot and connecting said stem portions for angular movement with the valve element, and the valve including stationary structural means defining a locking recess adapted to receive said outwardly extending tongue in one position of the valve element.

4. A locking type gas valve including an axially extending valve element, an operating stem portion, a second stem portion drivingly connected to the first portion and axially movable relative to the first portion and closely surrounding a substantial length of the first portion so as to be guided by the latter when axially moved relative to it, a valve element locking washer encircling and fixedly secured to said second stem portion and having a locking projection located radially outwardly from said second stem portion, stationary structure on the valve having a recess adapted to receive said locking projection, and spring means acting on said second stem portion and washer for yieldably holding said locking projection in said recess.

VINCENT C. PETERSON.
HENRY H. NADASDY.

References Cited in the file of this patent

UNITED STATES PATENTS

| Number | Name | Date |
|---|---|---|
| 1,714,374 | Jorgensen | May 21, 1929 |
| 2,035,762 | Roberts | Mar. 31, 1936 |
| 2,161,523 | Moecker | June 6, 1939 |
| 2,257,886 | Mueller | Oct. 7, 1941 |
| 2,262,703 | Stuckenholt | Nov. 11, 1941 |

FOREIGN PATENTS

| Number | Country | Date |
|---|---|---|
| 178,675 | Switzerland | 1935 |
| 468,939 | Great Britain | 1937 |